Dec. 23, 1958  E. H. BARLOW  2,865,595
SELF-CLOSING ANTI-KNOCK VALVE
Filed Nov. 17, 1953

INVENTOR
Edward H. Barlow
BY
H. F. Johnston
ATTORNEY

2,865,595

SELF-CLOSING ANTI-KNOCK VALVE

Edward H. Barlow, Waterbury, Conn., assignor to Scovill Manufacturing Company, Waterbury, Conn., a corporation of Connecticut Application November 17, 1953, Serial No. 392,551

1 Claim. (Cl. 251—118)

My invention relates to an improved water hammer control device for valves and is especially useful in valves of the spring-closed push button type.

Various proposals have been made for the control of water hammer in valves used in plumbing devices and other apparatus. Some of these devices involve the use of pistons and others involve sleeves with V-shaped holes for gradually cutting off the water flow when the valve is being closed. Other proposals involve the use of stationary baffles in the valve casing. These devices are not altogether suitable for push button valves of the type used in plumbing fixtures because they are relatively complicated, bulky and expensive.

According to my invention I employ a very simple and inexpensive cap device around the valve head which not only baffles the flow of water to some extent but also directs the water to the underside of the valve head when the valve is open and during the greater part of its closing movement. This cap is not only easy to manufacture but rests loosely in an enlarged bore in the valve casing around the valve head thus presenting no problem in assembling.

In the accompanying drawing I have shown for purposes of illustration one embodiment which my invention may assume in practice, wherein Fig. 1 is a longitudinal sectional view of a valve device embodying my invention and showing the valve in closed position.

Figure 1:
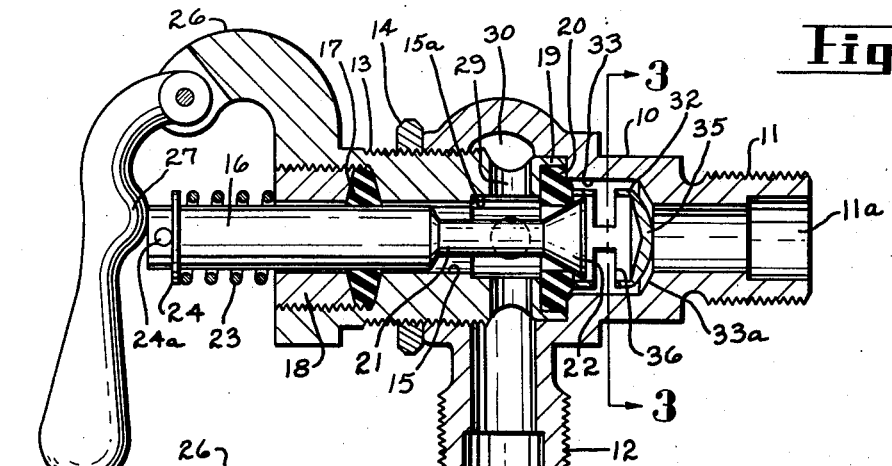

Referring to the details of the drawing, the numeral 10 represents an elbow casing or body having terminal threaded portions 11 and 12 surrounding inlet and outlet ports 11a and 12a respectively. The threaded portions 11 and 12 may be connected into a piping system with any conventional pipe connections. The casing 10 supports a threaded nipple 13 held in place by a lock nut 14. The nipple 13 is provided with an axial bore 15 of a size to slidably receive a valve stem 16 which is sealed relative to the nipple by a packing ring 17 and a gland nut 18 threaded into said nipple.

The inner end of the nipple is formed with an axially projecting flange 19 that provides an end recess to receive a valve seat 20 in the form of an annular composition disc. The inner end of the valve stem is formed with a reduced section 21 that terminates in an enlarged conical shaped valve head 22. The conical surface of the head 22 is normally seated against the inner face of the valve seat 20 and tensionally held thereagainst by a coil spring 23 surrounding the outer end of the valve stem and compressed between the adjacent face of the gland nut 18 and a washer 24 held in place on stem 16 by cross pin 24a.

The valve stem 16 is adapted to be operated by a handle lever 25 pivoted in a lug extension 26 which may be formed as an integral part of the nipple 13. The handle lever 25 may be hung in a dependent position and is formed with a protruding nub 27 normally engaged against the end of the valve stem 16.

The inner end of the nipple 13 inwardly of the valve stem bore 15 is formed with an enlarged chamber 15a into which are connected cross bores 29 and through which water is directed into a chamber 30 provided in the casing 10.

The means for preventing the water hammer is in the form of a cup-shaped cap 32 acting as a water deflector and pressure equalizer for the valve head 22. This deflector cap 32 is preferably hexagonal in cross section and of a size such that its apices will have a slip fit within an enlarged chamber 33 in the casing 10. The cap of hexagonal shape fitted in the chamber 33 will provide a series of segment areas 34 through which the water can pass when the valve is opened. The cap 32 has a domed end 35 that is directed outwardly toward the inlet bore 11a and its open end is abutted against the valve seat 20 and held thereinplace by the water pressure. The enlarged chamber 33 connects with the inlet port 11a by an inclined or conical shoulder 33a and the relative position of the domed end 35 of the cap 32 is such as to provide an annular space therebetween. The hollow chamber of the cap 32 has a free fit about the valve head 22 and the mid portion of the cap is provided with a pair of relatively large opposed cross slots 36 through which the water must pass when the valve is in open position.

Figure 2:
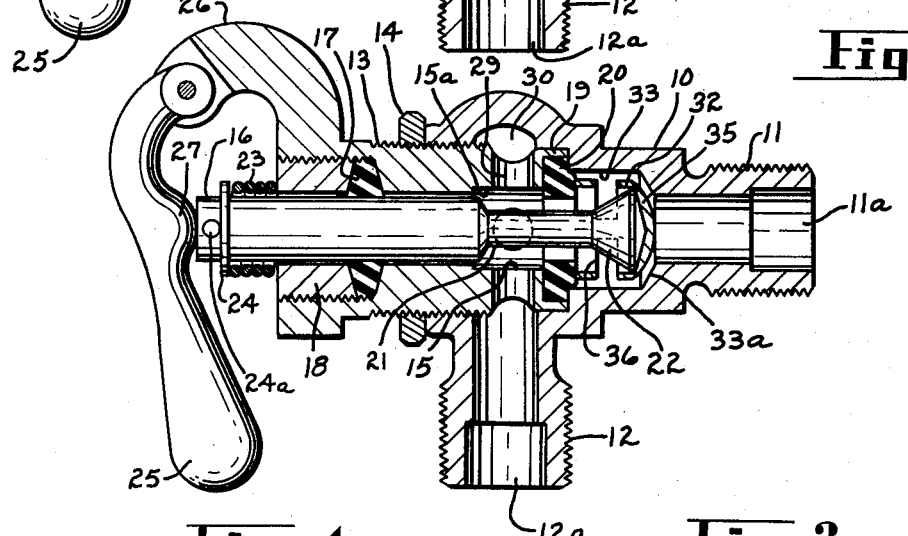
Fig. 2 is a similar view showing the valve in open position.
Figure 4:
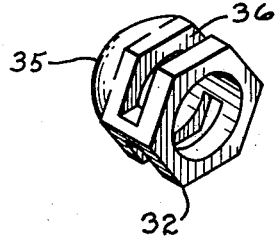
Fig. 4 is a perspective view of the diverter or baffle cap per se.
Figure 3:
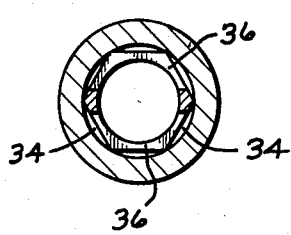
Fig. 3 is a cross-sectional view through the valve taken along the line 3—3 of Fig. 1.

In the operation of the valve device the handle lever 25 will be moved inwardly against the valve stem or in a counterclockwise position as viewed in Figs. 1 and 2 urging the valve stem inwardly against the influence of the spring 23 and causes the valve head to unseat from the valve seat and move into the deflector cap to a position adjacent its domed end as seen in Fig. 2.

When the valve head 22 is in open position the water entering the inlet bore 11a will be caused to deflect around the domed end 35 of the cap 32 into the sector areas 34 and then deflect through the cap slots 36. The water will next pass through the valve seat 20 into the nipple enlarged chamber 15a out through the cross bores 29 into the casing chamber 30 and out through the discharge bore 12a. The position of the slots 36 in the cap is such that water flowing therethrough will impinge against the conical surface of the valve head 22 and tend to hold the valve head in open position against the closing influence of the spring 23.

The purpose of the deflector cap is to prevent the water hammer that usually occurs when the valve is being closed against the full head of the water flowing against the valve head. As the valve head 22 is closing it will be noted that water passing through the cap slots 36 will be directed against the conical surface of the head during the greater portion of the closing stroke, and after the head has passed the cap slots 36 during the short remaining distance on the closing stroke the water passing through said slots will be directed laterally against the end surface of the head rather than in a straight axially direction, thus the cap 22 is very effective in assuring that there will be no water hammer or similar annoying knocking effects.

It is obvious that minor changes in details of construction and arrangement of parts may be made without departing from the scope of the present invention as set forth in the appended claim.

What I claim is:

In a valve construction, a valve casing, a stationary valve seat mounted in said casing, a valve stem axially movable in said casing, a valve head on one end of said stem having a conical surface movable toward and away from the valve seat for closing and opening the valve, the valve casing having an enlarged bore communicating with a smaller inlet bore with a shoulder therebetween, said larger bore providing a space into which the valve head moves in opening the valve against the direction of flow of fluid, spring means for urging the valve head to closed position, a flow deflector cap of polygonal cross-section and of a size such that its apices are slidably fitted in said enlarged bore and having an open end which rests against the valve seat and a closed end which is adjacent said shoulder to direct the incoming flow of fluid between said closed end and shoulder and around the sides of the cap, the sides of the cap having apertures intermediate its ends to direct the flow of fluid therethrough in a lateral direction, such flow being directed against the conical surface of said valve head when the latter is in open position and during a part of its closing movement and serving to counteract the quick closing effect of the spring means.

References Cited in the file of this patent

UNITED STATES PATENTS

| | | |
|---|---|---|
| 754,032 | Wright | Mar. 8, 1904 |
| 934,620 | Mueller | Sept. 21, 1909 |
| 1,024,093 | Mueller | Apr. 23, 1912 |
| 1,153,343 | Saefke | Sept. 14, 1915 |
| 1,809,419 | Muller | June 9, 1931 |
| 2,002,086 | Dylewski | May 21, 1935 |

FOREIGN PATENTS

| | | |
|---|---|---|
| 8,318 | Great Britain | of 1894 |
| 17,196 | Great Britain | Aug. 7, 1903 |